（12） United States Patent
Lu et al.

(10) Patent No.: US 10,749,223 B2
(45) Date of Patent: Aug. 18, 2020

(54) TRAY, TRAY ASSEMBLY, BATTERY PACK ASSEMBLY AND VEHICLE (71) Applicant: BYD COMPANY LIMITED, Shenzhen, Guangdong (CN)

(72) Inventors: Zhipei Lu, Shenzhen (CN); Xuefeng Zhang, Shenzhen (CN); Jia Lu, Shenzhen (CN); Qingbo Peng, Shenzhen (CN); Wei Liu, Shenzhen (CN); Jianhua Zhu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/092,573

(22) PCT Filed: Mar. 30, 2017

(86) PCT No.: PCT/CN2017/078875
§ 371 (c)(1),
(2) Date: Oct. 10, 2018

(87) PCT Pub. No.: WO2017/177831
PCT Pub. Date: Oct. 19, 2017

(65) Prior Publication Data
US 2019/0131674 A1 May 2, 2019

(30) Foreign Application Priority Data
Apr. 11, 2016 (CN) .......................... 2016 1 0222401

(51) Int. Cl.
H01M 2/10 (2006.01)
H01M 10/613 (2014.01)
(Continued)

(52) U.S. Cl.
CPC ......... H01M 10/613 (2015.04); B60L 3/0015 (2013.01); B60L 50/64 (2019.02);
(Continued)

(58) Field of Classification Search
CPC ............. H01M 10/613; H01M 10/625; H01M 10/647; H01M 10/653; H01M 10/6552;
(Continued)

(56) References Cited

U.S. PATENT DOCUMENTS

2009/0292335 A1* 11/2009 Leonov .................... A61N 1/08
607/35
2011/0132580 A1* 6/2011 Herrmann ................. F28F 3/12
165/104.33
(Continued)

FOREIGN PATENT DOCUMENTS

CN 102057532 A 5/2011
CN 102881957 A 1/2013
(Continued)

OTHER PUBLICATIONS

International Search Report and Written Opinion for Application No. PCT/CN2017/078875, dated Jun. 30, 2017, 9 pages.
(Continued)

Primary Examiner — Raymond Alejandro (57) ABSTRACT

A tray, a tray assembly, a battery pack assembly and a vehicle are provided. The tray includes a bottom plate having a plurality of sub-bottom plates and a flow channel in at least one of the plurality of sub-bottom plates. The at least one of the plurality of sub-bottom plates is configured to support a battery assembly. The tray further includes a frame disposed around and configured to support the bottom plate. The tray provides a reduced volume requirement on the cavity for holding the battery assembly. The flow channels are arranged more concisely, and a water cooling mode and an air cooling mode are employed in the tray.

20 Claims, 5 Drawing Sheets (51) Int. Cl.
| | |
|---|---|
| *F28F 3/12* | (2006.01) |
| *H01M 10/625* | (2014.01) |
| *H01M 10/647* | (2014.01) |
| *H01M 10/6556* | (2014.01) |
| *H01M 10/653* | (2014.01) |
| *H01M 10/6568* | (2014.01) |
| *B60L 3/00* | (2019.01) |
| *B60L 50/64* | (2019.01) |
| *B60L 58/26* | (2019.01) |
| *H01M 10/6552* | (2014.01) |
| *H01M 10/6554* | (2014.01) |
| F28D 15/02 | (2006.01) |
| F28F 9/02 | (2006.01) |
| F28D 1/03 | (2006.01) |
| F28F 21/08 | (2006.01) |
| B60R 16/033 | (2006.01) |

(52) U.S. Cl.
CPC ............ *B60L 58/26* (2019.02); *F28F 3/12* (2013.01); *H01M 2/1077* (2013.01); *H01M 10/625* (2015.04); *H01M 10/647* (2015.04); *H01M 10/653* (2015.04); *H01M 10/6552* (2015.04); *H01M 10/6554* (2015.04); *H01M 10/6556* (2015.04); *H01M 10/6568* (2015.04); *B60R 16/033* (2013.01); *B60Y 2306/05* (2013.01); *B60Y 2400/112* (2013.01); *F28D 1/035* (2013.01); *F28D 15/0275* (2013.01); *F28F 9/0246* (2013.01); *F28F 21/084* (2013.01); *F28F 21/085* (2013.01); *F28F 2220/00* (2013.01); *F28F 2230/00* (2013.01); *F28F 2255/143* (2013.01); *F28F 2255/16* (2013.01); *F28F 2265/16* (2013.01); *F28F 2270/00* (2013.01)

(58) Field of Classification Search
CPC ......... H01M 10/6554; H01M 10/6556; H01M 10/6568; H01M 10/1077; B60L 50/64; B60L 58/26; B60L 3/0015; F28F 3/12; F28F 9/0246; F28F 21/084; F28F 21/085; F28F 2220/00; F28F 2230/00; F28F 2255/143; F28F 2255/16; F28F 2265/16; F28F 2270/00; B60R 16/033; B60Y 2306/05; B60Y 2400/112; F28D 1/035; F28D 15/0275

See application file for complete search history.

(56) References Cited

U.S. PATENT DOCUMENTS

| | | | |
|---|---|---|---|
| 2013/0014923 A1 | 1/2013 | Girmscheid et al. | |
| 2015/0263397 A1 | 9/2015 | Janarthanam et al. | |

FOREIGN PATENT DOCUMENTS

| | | | | |
|---|---|---|---|---|
| CN | 103346363 A | 10/2013 | | |
| CN | 104916878 A | 9/2015 | | |
| CN | 105098285 A | 11/2015 | | |
| CN | 105098287 A | 11/2015 | | |
| JP | 55-96896 | * | 7/1980 | ............ F23F 23/00 |
| JP | 4301750 B2 | | 7/2009 | |

OTHER PUBLICATIONS

First Office Action for Chinese Application No. 201610222401.0, dated Aug. 3, 2018, 7 pages.

* cited by examiner

TRAY, TRAY ASSEMBLY, BATTERY PACK ASSEMBLY AND VEHICLE

CROSS REFERENCE TO RELATED APPLICATIONS

The present application is a national phase application of International Patent Application No. PCT/CN2017/078875, filed on Mar. 30, 2017, which claims priority to and benefits of Chinese Patent Application No. 201610222401.0, filed on Apr. 11, 2016. The contents of the above-referenced applications are incorporated herein by reference in their entirety.

TECHNICAL FIELD

The present invention relates to the field of vehicle manufacturing technologies, and specifically, to a tray, a tray assembly provided with the tray, a battery pack assembly provided with the tray and a vehicle provided with the battery pack assembly.

BACKGROUND

In the related art, a battery pack assembly of a vehicle is usually mounted on a tray, the tray and an enclosure jointly define a cavity used to hold a battery assembly, and various cooling water channels or cooling air channels whose structures are complex are provided in the cavity. This structure requires that the cavity has a relatively large space, and a cooling water channel and a cooling air channel cannot be compatible with each other. Therefore, commonality is not strong. Particularly, for a water cooling structure, wiring of a cooling water channel is complex, and once leakage occurs, the battery assembly is likely to be short-circuited, affecting service life and service safety of the battery pack assembly.

SUMMARY

The present invention seeks to solve at least one of the technical problems existing in the related art to at least some extent. To this end, an objective of the present invention is to propose a tray.

Another objective of the present invention is to propose a tray assembly having the foregoing tray.

Still another objective of the present invention is to propose a battery pack assembly having the foregoing tray.

Additionally another objective of the present invention is to propose a vehicle having the foregoing battery pack assembly.

A tray according to an embodiment of a first aspect of the present invention includes: a bottom plate, where the bottom plate includes a plurality of sub-bottom plates, flow channels are provided in at least some sub-bottom plates of the plurality of sub-bottom plates, and a battery assembly is suitable for being mounted on a sub-bottom plate in which a flow channel is provided; and a frame, where the frame is disposed around the bottom plate.

Based on the tray according to the embodiment of the first aspect of the present invention, the flow channels are integrated in the tray, a volume requirement on the cavity for holding the battery assembly may be reduced, the flow channels are arranged more concisely, wiring of the flow channels is clearer, and water cooling and air cooling may be compatible. Particularly, in a water cooling mode, even if a cooling liquid leaks, the cooling liquid may directly flow outward, the battery assembly is not short-circuited, the battery assembly is used more safely, and the tray provided with the flow channels can further implement energy-absorbing crumple at the time of encountering collisions. This may relatively well protect the battery assembly.

Additionally, the tray according to the foregoing embodiment of the present invention may further have the following additional technical characteristics:

Optionally, the plurality of sub-bottom plates includes: at least one first sub-bottom plate, where the flow channel is provided in the first sub-bottom plate, and the battery assembly is suitable for being mounted on the first sub-bottom plate; and at least one second sub-bottom plate, where the second sub-bottom plate and the first sub-bottom plate are spliced.

Preferably, there are a plurality of first sub-bottom plates and a plurality of second sub-bottom plates, and the plurality of second sub-bottom plates and the plurality of first sub-bottom plates are staggered.

Preferably, there is a plurality of first sub-bottom plates, and the plurality of first sub-bottom plates is connected in parallel to a plurality of flow channels in a one-to-one correspondence to the plurality of first sub-bottom plates.

Optionally, the first sub-bottom plate includes: a first part, where a plurality of channels is provided in the first part; and two second parts, where the two second parts are respectively disposed at two ends of the first part, at least one groove opening toward the first part is provided in each second part, and the plurality of channels is in communication with the groove to form the flow channel.

Optionally, a pipe connector is disposed on each second part, and the flow channel is suitable for being in communication with a heat exchange device with the pipe connector.

Optionally, the two second parts are respectively welded to the two ends of the first part.

Optionally, the first sub-bottom plate includes: a main body part, where a flow path is provided in the main body part, and a middle portion of the flow path is provided with a plurality of opening portions; and a plurality of seal portions, where the plurality of seal portions seals the plurality of opening portions in a one-to-one correspondence to form the flow channel.

Optionally, each seal portion is welded onto the main body part.

Optionally, at least two connectors are disposed on the main body part, and the heat exchange device is in communication with the flow channel with the connectors.

Optionally, the sub-bottom plate in which the flow channel is provided and the flow channel inside the sub-bottom plate are integrally formed through injection molding.

Preferably, the flow channel is formed through extrusion.

Optionally, the flow channel is formed by inserting a metal pipe into a slot of the bottom plate.

Optionally, the sub-bottom plate in which the flow channel is provided includes an upper plate and a lower plate, and the upper plate and the lower plate are connected to define the flow channel between the upper plate and the lower plate.

Optionally, a surface of the bottom plate away from the battery assembly is covered with heat preservation cotton.

A tray assembly according to an embodiment of a second aspect of the present invention includes: any tray according to the first aspect; and a heat exchange device, where the heat exchange device is used to drive a heat exchange medium to flow in the flow channel.

A battery pack assembly according to an embodiment of a third aspect of the present invention includes: at least one battery assembly; and any tray according to the first aspect, where each battery assembly is mounted onto the tray.

Additionally, the battery pack assembly according to the foregoing embodiment of the present invention may further have the following additional technical characteristics:

Optionally, each battery assembly includes: a battery; and a cooling plate, where the battery is connected to the tray with the cooling plate.

Preferably, the cooling plate includes: a plate body, where a mounting slot is provided on the plate body; and a heat pipe, where the heat pipe is disposed in the mounting slot.

Preferably, the mounting slot includes: a first mounting slot, where the first mounting slot is provided at a side of the plate body toward the battery; and a second mounting slot, where the second mounting slot is provided at another side of the plate body away from the battery.

Preferably, there are a plurality of first mounting slots and a plurality of second mounting slots, and the plurality of second mounting slots and the plurality of first mounting slots are staggered with each other.

Optionally, each battery assembly includes a plurality of cooling plates, and each battery assembly further includes: a batten, where the batten extends along circumference of the battery, and each of the plurality of cooling plates is tightly attached to the battery and is fastened with the batten.

Optionally, the battery pack assembly further including: a heat conduction pad, where the heat conduction pad is disposed between the tray and the battery assembly.

Optionally, the battery pack assembly further including: an enclosure, where the enclosure is connected to the tray, so as to form a cavity suitable for holding the battery assembly.

A vehicle according to an embodiment of a fourth aspect of the present invention is provided with any battery pack assembly according to the third aspect.

The vehicle and the foregoing battery pack assembly have a same advantage relative to the prior art, and details are not described herein again.

BRIEF DESCRIPTION OF THE DRAWINGS

These and other aspects and advantages of embodiments of the present invention will become apparent and more readily appreciated from the following descriptions made with reference to the drawings, in which.

Reference numerals of the accompanying drawing:

battery pack assembly 1, tray assembly 10, tray 100, frame 110, bottom plate 120, first sub-bottom plate 121, first part 1211, second part 1212, main body part 1213, seal portion 1214, second sub-bottom plate 122, flow channel 130, channel 131, groove 132, pipe connector 140, connector 150, heat exchange device 160, heat preservation cotton 170, battery assembly 20, battery 210, cooling plate 220, plate body 221, heat pipe 222, batten 230, heat conduction sheet 240, and enclosure 30.

DETAILED DESCRIPTION

Reference will be made in detail to embodiments of the present invention. The embodiments described herein with reference to drawings are explanatory, illustrative, and should be used to generally understand the present invention. The embodiments described below with reference to the accompanying drawings are exemplary, aiming to explain the present invention, but cannot be understood as a limitation on the present invention.

In the description of the present invention, it should be understood that, a direction or location relationship indicated by a term "center", "longitudinal", "transverse", "length", "width", "thickness", "upper", "lower", "front", "rear", "horizontal", "top", "bottom", "inner", "outer", "circumference", or the like is a direction or location relationship shown based on the accompanying drawings, and is intended only conveniently describe the present invention and simplify the description, but is not intended to indicate or imply that a mentioned apparatus or element needs to have a particular direction and is constructed and operated in the particular direction. Therefore, the direction or location relationship cannot be understood as a limitation on the present invention.

In addition, terms "first" and "second" are used only for description objectives, and shall not be construed as indicating or implying relative importance or implying a quantity of indicated technical features. Therefore, a feature restricted by "first" or "second" may explicitly indicate or implicitly include at least one such feature. In the descriptions of the present invention, "multiple" refers to at least two, for example, two, or three, unless otherwise specifically limited in detail.

In the present invention, unless explicitly specified or limited otherwise, the terms "mounted", "connected", "connection", and "fixed" should be understood broadly, for example, which may be fixed connections, detachable connections or integral connections; may be mechanical connections or electrical connections; may be direct connections, indirectly connected with each other through an intermediate medium, or communications inside two elements or an interaction relationship of two elements, unless otherwise specifically limited. Those of ordinary skill in the art can understand specific meanings of the terms in the present invention according to specific situations.

In the present invention, unless explicitly specified or limited otherwise, a first characteristic "on" or "under" a second characteristic may be the first characteristic in direct contact with the second characteristic, or the first characteristic in indirect contact with the second characteristic with an intermediate medium. Moreover, the first characteristic "on", "above" and "over" the second characteristic may be the first characteristic right above or obliquely above the second characteristic, or only indicates that a horizontal height of the first characteristic is greater than that of the second characteristic. The first characteristic "under", "below" and "beneath" the second characteristic may be the first characteristic right below or obliquely below the second characteristic, or only indicates that a horizontal height of the first characteristic is less than that of the second characteristic.

The present invention is described in detail below with reference to the accompanying drawings and the embodiments.

First referring to FIG. 1 to FIG. 6, a tray 100 according to an embodiment of the present invention is described in detail. As shown in FIG. 1 to FIG. 6, the tray 100 includes a frame 110 and a bottom plate 120. The bottom plate 120 may be connected to the frame 110, the frame 110 is disposed around the bottom plate 120, the bottom plate 120 includes a plurality of sub-bottom plates, flow channels 130 are provided in at least some sub-bottom plates of the plurality of sub-bottom plates, and a battery assembly 20 is suitable for being mounted on a sub-bottom plate in which a flow channel 130 is provided.

It may be understood that, the battery assembly 20 is suitable for being supported on the sub-bottom plate of the bottom plate 120 in which the flow channel 130 is provided, so as to perform heat exchange with a heat exchange medium in the flow channel 130, and the frame 110 is used to support the bottom plate 120, to prevent the bottom plate 120 from being deformed.

The battery assembly 20 may perform heat exchange with the heat exchange medium in the flow channel 130, thereby effectively controlling a temperature of the battery assembly 20. Optionally, the heat exchange medium may be a cooling liquid (such as water), or may be air. That is, a water cooling mode and an air cooling mode may be compatible in the tray 100.

Based on the tray 100 according to this embodiment of the present invention, the flow channels 130 are integrated in the tray 100, a volume requirement on the cavity for holding the battery assembly 20 may be reduced, the flow channels 130 are arranged more concisely, wiring of the flow channels 130 is clearer, and the water cooling mode and the air cooling mode may be compatible. Particularly, in the water cooling mode, even if a cooling liquid leaks, the cooling liquid may directly flow outward, the battery assembly 20 is not short-circuited, the battery assembly 20 is used more safely, and the tray 100 provided with the flow channels 130 can further implement energy-absorbing crumple at the time of encountering collision. This may relatively well protect the battery assembly 20.

Optionally, the tray 100 may be an aluminum product or an aluminum alloy product. Therefore, the tray 100 has a large strength, good heat conduction performance, and a light weight.

In some optional embodiments of the present invention, the flow channel 130 may be formed through extrusion. That is, the flow channel 130 may be completely provided in the tray 100, and a circumferential wall of the flow channel 130 may be defined by the tray 100. Therefore, the flow channel 130 has a relatively simple structure, production costs are low, there are a small quantity of obstructions between the heat exchange medium in the flow channel 130 and the battery assembly 20, and heat exchange efficiency is high.

In some optional embodiments of the present invention, the sub-bottom plate 120 in which the flow channel 130 is provided and the flow channel 130 inside the sub-bottom plate 120 are integrally formed through injection molding.

In some other optional embodiments of the present invention, the flow channel 130 may be formed by inserting a metal pipe into a slot of the bottom plate 120.

That is, a slot may be provided on the bottom plate 120, the shape of the slot may be similar to the shape of the flow channel 130, and the metal pipe adapting to the shape of the slot is inserted into the slot, and the flow channel 130 is formed in the metal pipe. Therefore, a manufacturing technique of the flow channel 130 is relatively simple.

Further, the slot may be provided on a surface of the bottom plate 120 away from the battery assembly 20, and the slot may open downward. Therefore, a case in which the cooling liquid flows, when the metal pipe is ruptured, onto the bottom plate 120 to cause the battery assembly 20 to be short-circuited may be prevented, and the battery assembly 20 has better safety.

Optionally, the metal pipe may be a copper pipe, the copper pipe has relatively good plasticity and is easily inserted into the slot, and copper pipe has relatively good heat conduction performance. This is favorable to heat exchange between the heat exchange medium and the battery assembly 20.

In some still other optional embodiments of the present invention, the sub-bottom plate 120 in which the flow channel 130 is provided may include an upper plate and a lower plate, and the upper plate and the lower plate are connected to define the flow channel 130 between the upper plate and the lower plate.

For example, the slot corresponding to the flow channel 130 may be fabricated between the upper plate and the lower plate, and the flow channel 130 may be defined after the upper plate is connected to the lower plate. Optionally, the upper plate and the lower plate may be connected through welding, or may be connected with a thread connection member.

Figure 3:
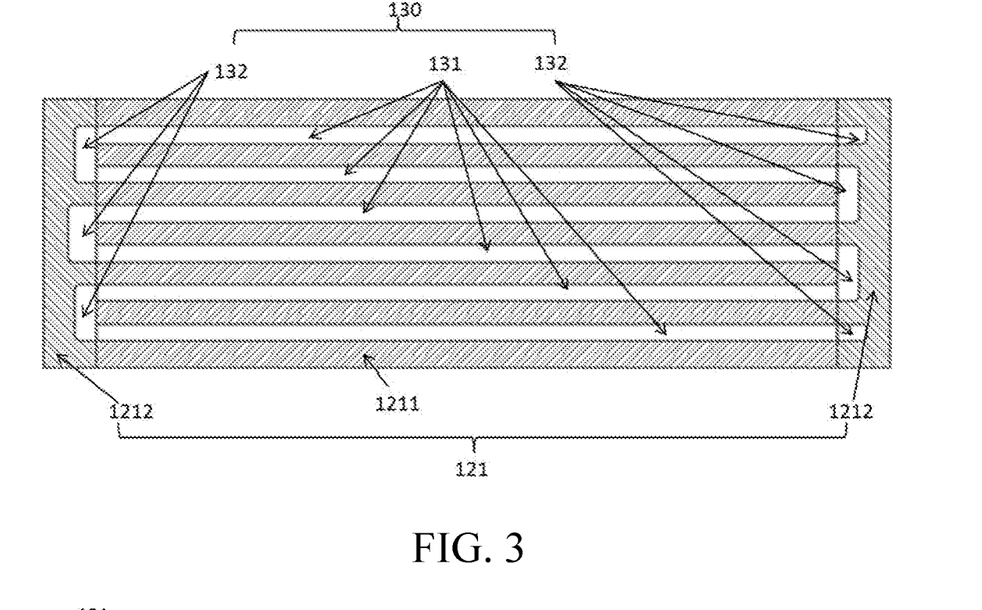
FIG. 3 is a sectional view of a first sub-bottom plate according to an embodiment of the present invention.
Figure 5:
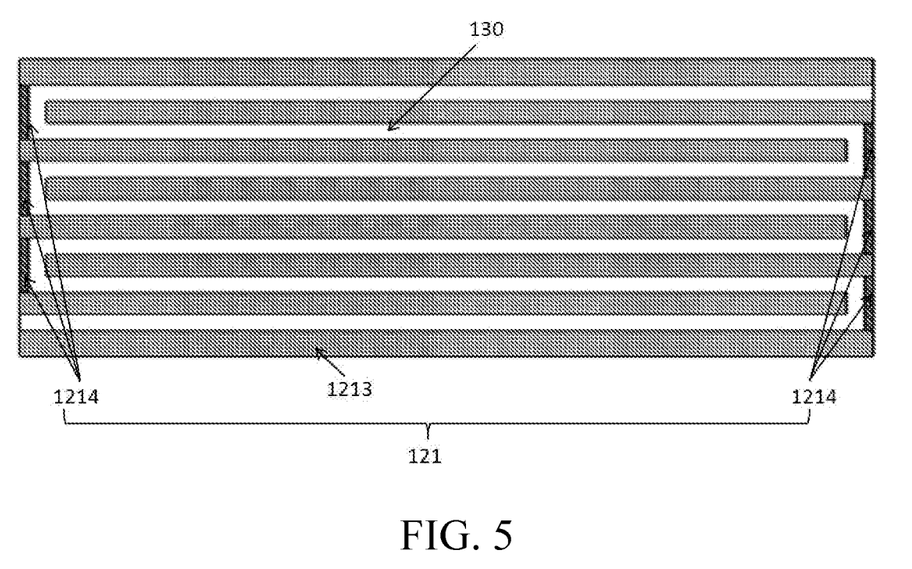
FIG. 5 is a sectional view of a first sub-bottom plate according to another embodiment of the present invention.

Preferably, as shown in FIG. 3 and FIG. 5, the flow channel 130 may be constructed into a wave shape. On the tray 100 having a same size, constructing the flow channel 130 into the wave shape may prolong a flow travel of the flow channel 130, and enhance a heat exchange effect of the heat exchange medium in the flow channel 130.

Figure 1:
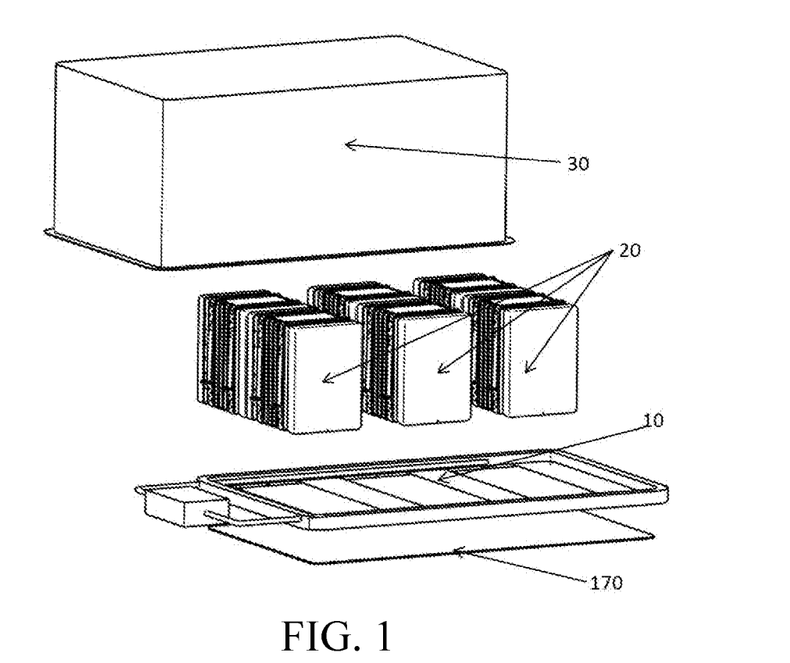
FIG. 1 is an exploded view of a battery pack assembly according to an embodiment of the present invention.
Figure 2:
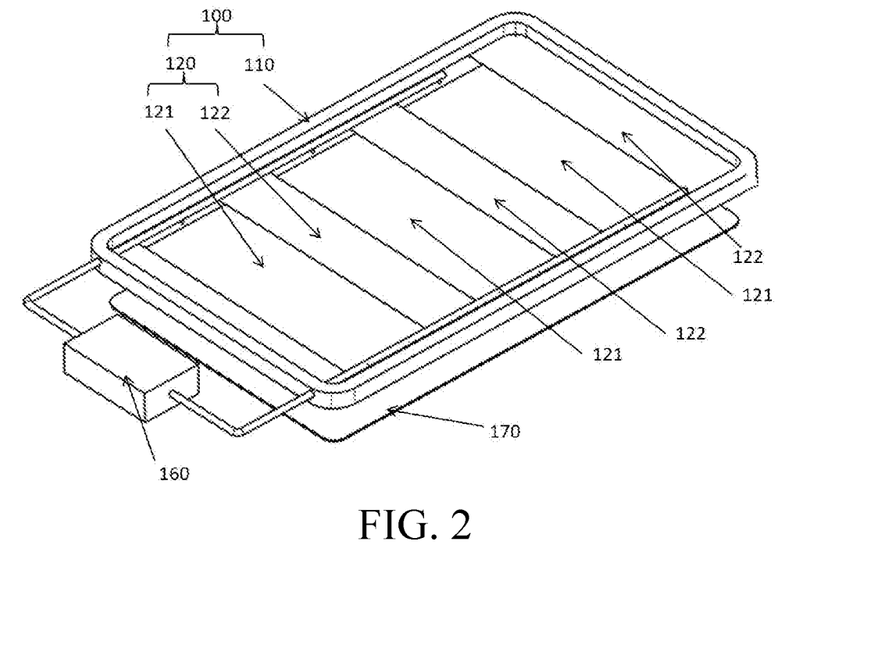
FIG. 2 is a schematic structural diagram of a tray assembly according to an embodiment of the present invention.

Preferably, as shown in FIG. 1 and FIG. 2, a surface of the bottom plate 120 away from the battery assembly 20 may be covered with heat preservation cotton 170, so as to selectively reduce heat exchange efficiency of the heat exchange medium in the flow channel 130, thereby controlling the temperature of the battery assembly 20 more precisely.

Preferably, the plurality of sub-bottom plates of the bottom plate 120 may include at least one first sub-bottom plate 121, the first sub-bottom plate 121 may be connected to the frame 110, a flow channel 130 may be provided in the first sub-bottom plate 121, and a battery assembly 20 is suitable for being mounted on the first sub-bottom plate 121.

It may be understood that, the bottom plate 120 may include a plurality of first sub-bottom plates 121 spliced to each other. Therefore, a strength of a tray 100 formed through splicing is far higher than a strength of a tray 100 formed through stamping, and it is easy to manufacture trays 100 of various sizes.

In some optional embodiments, the bottom plate 120 may be completely formed by splicing a plurality of first sub-bottom plates 121. Therefore, the tray 100 has a good heat exchange effect.

In some other optional embodiments, as shown in FIG. 2, the bottom plate 120 may further include at least one second sub-bottom plate 122, the second sub-bottom plate 122 may be connected to the frame 110, and the second sub-bottom plate 122 and the first sub-bottom plate 121 are spliced. Further, there may be a plurality of second sub-bottom plates 122 and a plurality of first sub-bottom plates 121, and the plurality of second sub-bottom plates 122 and the plurality of first sub-bottom plates 121 may be staggered.

In other words, the bottom plate 120 may be formed by staggering and splicing the plurality of second sub-bottom plates 122 and the plurality of first sub-bottom plates 121, and no flow channel 130 is provided in each second sub-bottom plate 122, and the battery assembly 20 is suitable for being mounted on the first sub-bottom plate 121. Therefore, the tray 100 has a lower production cost and a higher strength.

Preferably, as shown in FIG. 2, there is a plurality of first sub-bottom plates 121, and the plurality of first sub-bottom plates 121 is connected in parallel to a plurality of flow channels 130 in a one-to-one correspondence to the plurality of first sub-bottom plates 121.

It may be understood that, a flow channel 130 may be provided in each first sub-bottom plate 121, and an inlet and an outlet of each flow channel 130 may be independently connected to a heat exchange device 160. Therefore, the first sub-bottom plates 121 corresponding to the flow channels 130 have basically same heat exchange efficiency, to ensure that the battery assemblies 20 have basically consistent temperatures, and the battery assemblies 20 have long service life and better use performance.

Some optional structures of the first sub-bottom plate 121 according to this embodiment of the present invention are described below.

Figure 4:
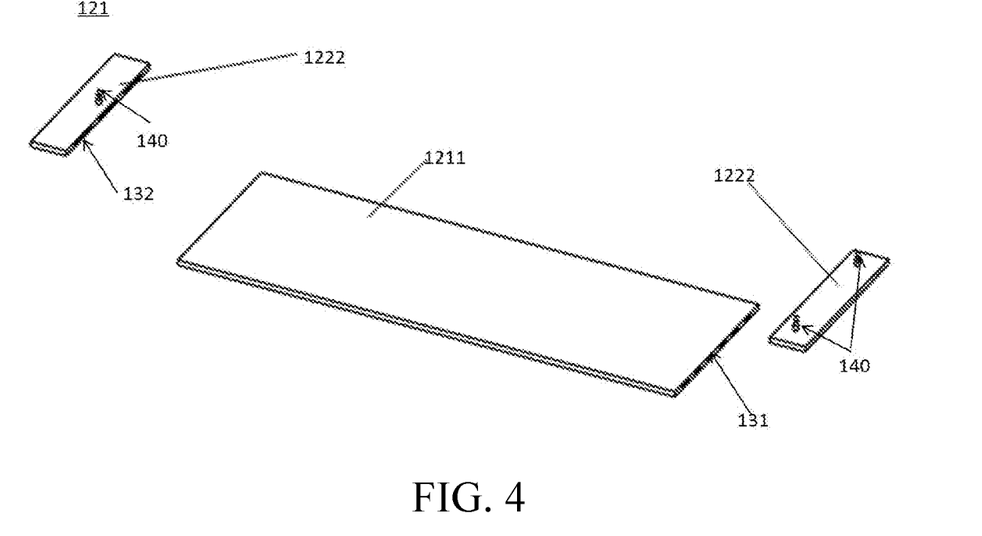
FIG. 4 is an exploded view of a first sub-bottom plate according to an embodiment of the present invention.

In some optional embodiments of the present invention, as shown in FIG. 3 and FIG. 4, each first sub-bottom plate 121 may include a first part 1211 and two second parts 1212.

A plurality of channels 131 may be provided in the first part 1211, the two second parts 1212 may be respectively disposed at two ends of the first part 1211, and at least one groove 132 opening toward the first part 1211 is provided in each second part 1212, and the plurality of channels 131 may be in communication with the groove 132 to form the flow channel 130.

It may be understood that, the plurality of channels 131 in the first part 1211 may be not in communication with each other, and the groove 132 provided in the second part 1212 may cause some neighboring channels 131 to be in communication, so that the plurality of channels 131 and the groove 132 jointly form the flow channel 130.

Optionally, the two second parts 1212 may be respectively welded to the two ends of the first part 1211.

Optionally, each of the first part 1211 and the second part 1212 may be an aluminum product or an aluminum alloy product. Therefore, the tray 100 has a large strength, good heat conduction performance, and a light weight.

Optionally, as shown in FIG. 3, the plurality of channels 131 may be provided in parallel.

Specifically, as shown in FIG. 3, six channels 131 may be provided in the first part 1211. Three grooves 132 may be provided in one second part 1212, a first groove 132 may be used to cause one end of a first channel 131 and one end of a second channel 131 to be in communication, a second groove 132 may be used to cause one end of a third channel 131 and one end of a fourth channel 131 to be in communication, and a third groove 132 may be used to cause one end of a fifth channel 131 and one end of a sixth channel 131 to be in communication. Four grooves 132 may be provided in the other second part 1212 among the four grooves 132, a first groove 132 may be in communication with the other end of the first channel 131, a second groove 132 may be used to be in communication with the other end of the second channel 131 and the other end of the third channel 131, a third groove 132 may be used to be in communication with the other end of the fourth channel 131 and the other end of the fifth channel 131, and a fourth groove 132 may be in communication with the other end of the sixth channel 131. Therefore, a complete flow channel 130 may be formed.

Optionally, as shown in FIG. 4, a pipe connector 140 may be disposed on each second part 1212, and the heat exchange device 160 may be in communication with the flow channel 130 with the pipe connector 140. Therefore, the heat exchange device 160 is connected to the flow channel 130 conveniently.

As shown in FIG. 4, in an embodiment in which a quantity of the channels 131 is an even number (such as six), the two ends of the flow channel 130 may be located in a same second part 1212. Correspondingly, the second part 1212 corresponding to endpoints of the flow channel 130 may be provided with two pipe connectors 140 respectively corresponding to the two ends of the flow channel 130, and the other second part 1212 may be provided with a pipe connector 140 corresponding to a middle portion of the flow channel 130. That is, the heat exchange medium in the flow channel 130 may flow from the two ends of the flow channel 130 toward the middle portion, or be divided into two branches from the middle portion of the flow channel 130 and flow toward the two ends of the flow channel 130.

In an embodiment in which a quantity of the channels 131 is an odd number, the two ends of the flow channel 130 may be located in the two second parts 1212 in a one-to-one correspondence. Correspondingly, a pipe connector 140 may be disposed on each second part 1212, and two pipe connectors 140 respectively correspond to the two ends of the flow channel 130. That is, the heat exchange medium in the flow channel 130 may flow from one end of the flow channel 130 to the other end.

Figure 6:
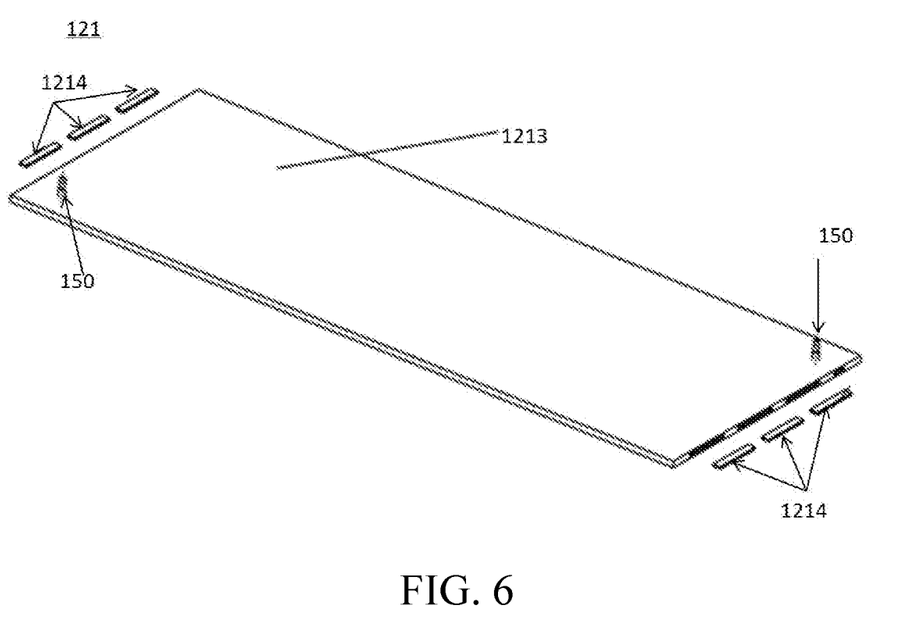
FIG. 6 is an exploded view of a first sub-bottom plate according to another embodiment of the present invention.

In some other optional embodiments of the present invention, as shown in FIG. 5 and FIG. 6, each first sub-bottom plate 121 may include a main body part 1213 and a plurality of seal portions 1214, a flow path may be provided in the main body part 1213, a middle portion of the flow path may be provided with a plurality of opening portions, and the plurality of seal portions 1214 may seal the plurality of opening portions in a one-to-one correspondence to form the flow channel 130.

It may be understood that, the shape of the flow path approximates to the shape of the flow channel 130. For convenience of fabrication, the middle portion of the flow path may be provided with the plurality of opening portions, and the flow channel 130 may be formed after the plurality of seal portions 1214 seals the plurality of opening portions in a one-to-one correspondence.

As shown in FIG. 6, when the two ends of the flow path (or the flow channel 130) are respectively located at two sides of the main body part 1213, two connectors 150 may be disposed on the main body part 1213, and the two connectors 150 respectively correspond to the two ends of the flow channel 130. That is, the heat exchange medium in the flow channel 130 may flow from one end of the flow channel 130 to the other end.

When the two ends of the flow path (or the flow channel 130) are both located at a same side of the main body part 1213, three connectors 150 may be disposed on the main body part 1213, and the three connectors 150 are in a one-to-one correspondence to the two ends of the flow channel 130 and the middle portion of the flow channel 130. That is, the heat exchange medium in the flow channel 130 may flow from the two ends of the flow channel 130 toward the middle portion, or be divided into two branches from the middle portion of the flow channel 130 and flow toward the two ends of the flow channel 130.

Optionally, each seal portion 1214 may be welded onto the main body part 1213. Therefore, the opening portions may be better sealed, to prevent the cooling liquid from leaking from the opening portions.

Optionally, each of the main body part 1213 and the seal portion 1214 may be an aluminum product or an aluminum alloy product. Therefore, the tray 100 has a large strength, good heat conduction performance, and a light weight.

To sum up, based on the tray 100 according to this embodiment of the present invention, the flow channels 130 are integrated in the tray 100, a volume requirement on the cavity for holding the battery assembly 20 may be reduced, the flow channels 130 are arranged more concisely, wiring of the flow channels 130 is clearer, and the water cooling mode and the air cooling mode may be compatible. Particularly, in the water cooling mode, even if a cooling liquid leaks, the cooling liquid may directly flow outward, the battery assembly 20 is not short-circuited, the battery assembly 20 is used more safely, and the tray 100 provided with the flow channels 130 can further implement energy-absorbing crumple at the time of encountering collision. This may relatively well protect the battery assembly 20. The tray 100 is formed by splicing extruded profiles, so that the tray 100 has a higher strength, and it may be further convenient to manufacture trays 100 of various sizes.

A tray assembly 10 according to an embodiment of the present invention is described below.

As shown in FIG. 1 to FIG. 6, the tray assembly 10 includes a tray 100 and a heat exchange device 160. The tray 100 is any tray 100 described in the foregoing embodiment, and a flow channel 130 is provided in a bottom plate 120 of the tray 100. The heat exchange medium is suitable for flowing in the flow channel 130, the heat exchange device 160 is connected to the flow channel 130 in the bottom plate 120, and the heat exchange device 160 is used to drive the heat exchange medium to flow in the flow channel 130 to perform heat exchange with the battery assembly 20.

It may be understood that, the battery assembly 20 may perform heat exchange with the heat exchange medium in the flow channel 130, and then the heat exchange medium performs heat exchange with the heat exchange device 160, thereby effectively controlling a temperature of the battery assembly 20. Optionally, the heat exchange medium may be a cooling liquid (such as water), or may be air. That is, a water cooling mode and an air cooling mode may be compatible in the tray assembly 10.

Based on the tray assembly 10 according to this embodiment of the present invention, the flow channels 130 are integrated in the bottom plate 120 of the tray 100, a volume requirement on the cavity for holding the battery assembly 20 may be reduced, the flow channels 130 are arranged more concisely, wiring of the flow channels 130 is clearer, and the water cooling mode and the air cooling mode may be compatible. Particularly, in the water cooling mode, even if a cooling liquid leaks, the cooling liquid may directly flow outward, the battery assembly 20 is not short-circuited, the battery assembly 20 is used more safely, and the tray 100 provided with the flow channels 130 can further implement energy-absorbing crumple at the time of encountering collision. This may relatively well protect the battery assembly 20.

A battery pack assembly 1 according to an embodiment of the present invention is described below.

As shown in FIG. 1 to FIG. 8, the battery pack assembly 1 according to this embodiment of the present invention includes a tray 100 and at least one battery assembly 20, the tray 100 is any tray 100 described in the foregoing embodiment, and each battery assembly 20 is mounted on the tray 100.

Based on the battery pack assembly 1 according to this embodiment of the present invention, by disposing the tray 100 of the foregoing structural form, the volume of the battery pack assembly 1 may be greatly reduced, the flow channels 130 of the battery pack assembly 1 are arranged concisely, wiring of the flow channels 130 is clearer, the water cooling mode and the air cooling mode may be compatible in the battery pack assembly 1. Particularly, in the water cooling mode, even if a cooling liquid leaks, the cooling liquid may directly flow outward, the battery assembly 20 is not short-circuited, the battery pack assembly 1 is used more safely, and the tray 100 provided with the flow channels 130 can further implement energy-absorbing crumple at the time of encountering collision. This may relatively well protect the battery assembly 20.

In some optional embodiments of the present invention, the battery pack assembly 1 may further include a heat conduction pad (not shown), and the heat conduction pad may be disposed between the tray 100 and the battery assembly 20. Therefore, the contact area between the battery assembly 20 and the tray 100 may be increased, to optimize heat exchange efficiency of the battery pack assembly 1.

Specifically, the heat conduction pad may be paved on the bottom plate 120 of the tray 100.

Optionally, the heat conduction pad may be constructed into an aluminum or copper sheet.

Optionally, as shown in FIG. 1, the battery pack assembly 1 may further include an enclosure 30, and the enclosure 30 may be connected to the tray 100, so as to form a cavity suitable for holding the battery assembly 20.

As shown in FIG. 1, the enclosure 30 may be connected to the frame 110 of the tray 100, so as to form a relative enclosed cavity, and the battery assembly 20 may be disposed in the cavity.

Figure 7:
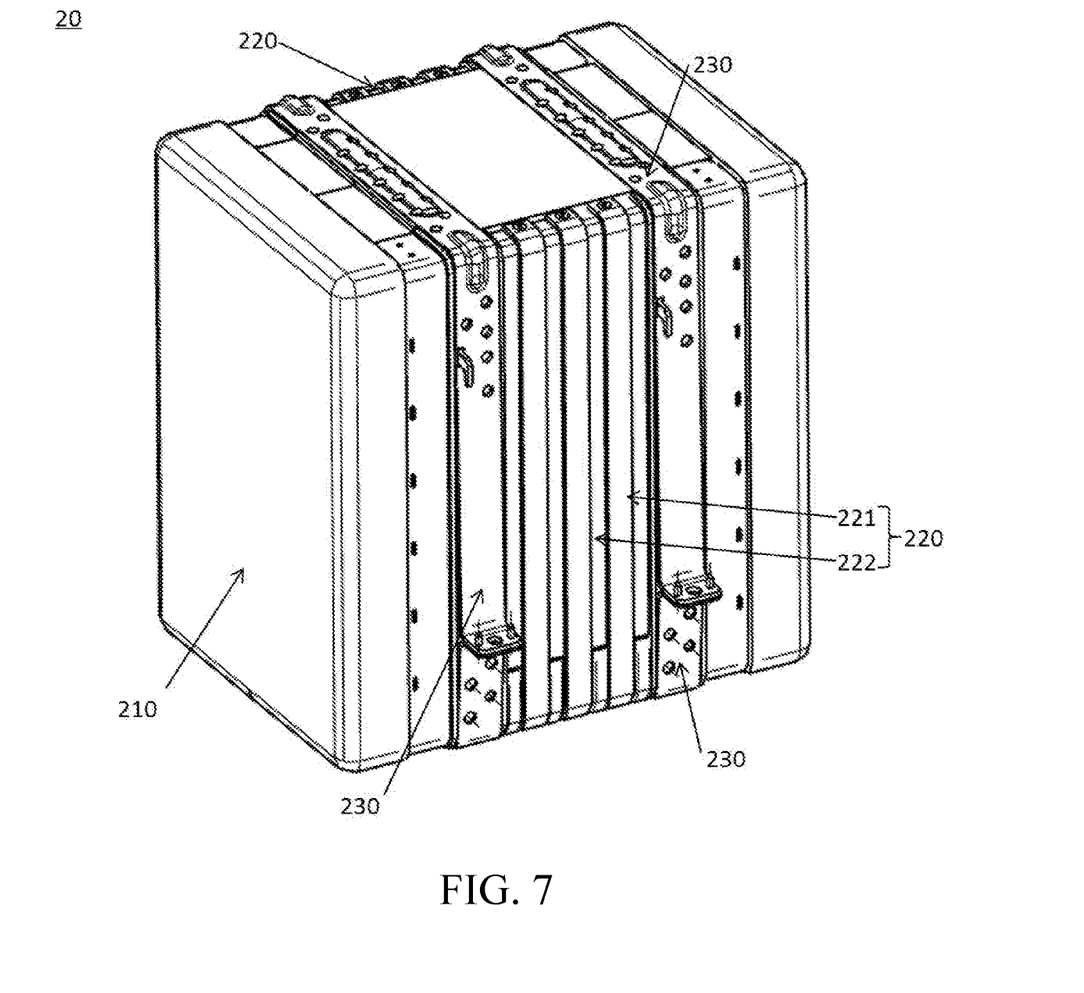
FIG. 7 is a schematic structural diagram of a battery assembly according to an embodiment of the present invention.
Figure 8:
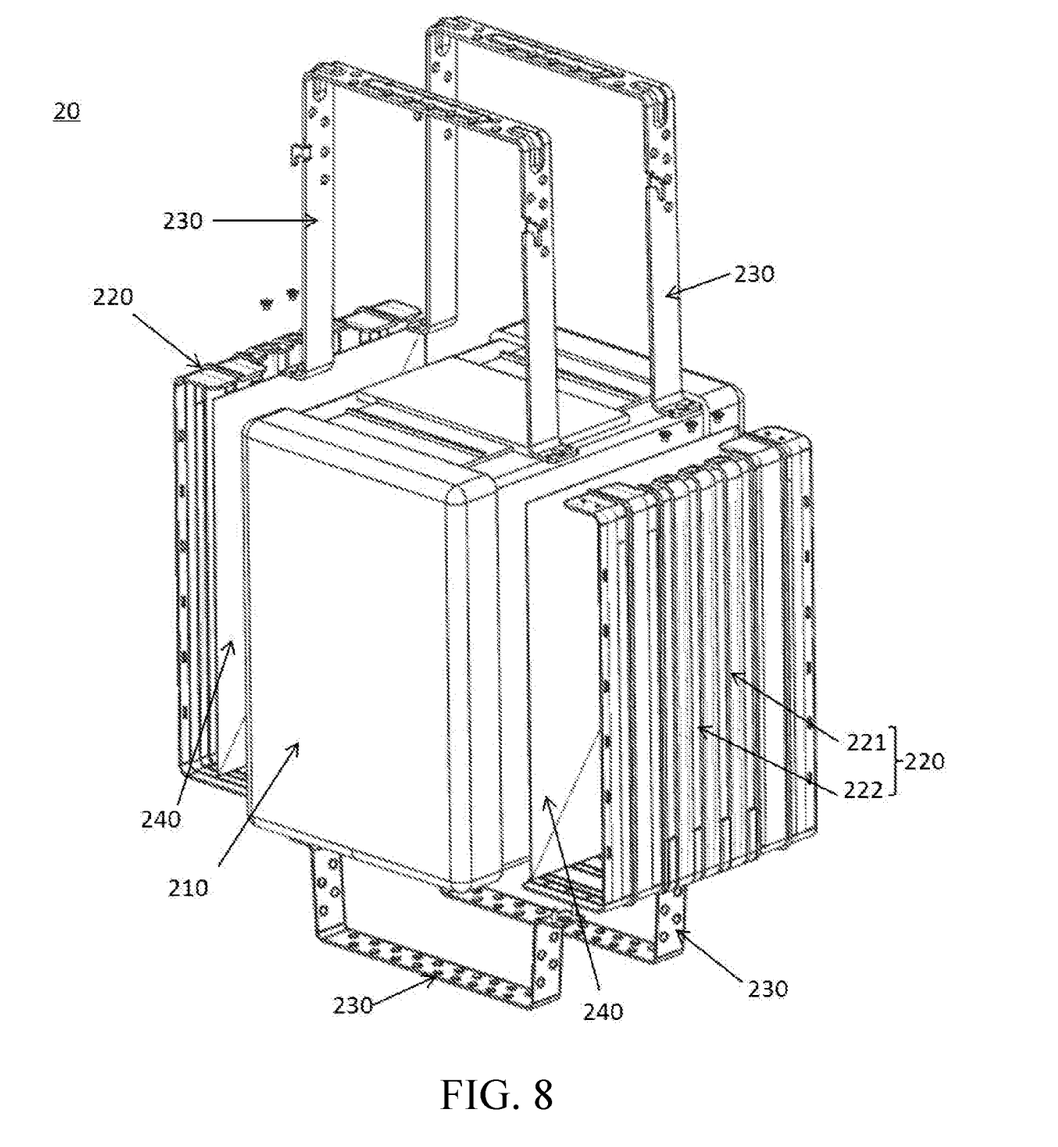
FIG. 8 is an exploded view of a battery assembly according to an embodiment of the present invention.

In some optional embodiments of the present invention, as shown in FIG. 1, FIG. 7 and FIG. 8, each battery assembly 20 includes a battery 210 and a cooling plate 220, and the battery 210 may be connected to the tray 100 with the cooling plate 220.

It may be understood that, the cooling plate 220 may wrap at least a part of an outer surface of the battery 210, and the cooling plate 220 may be tightly attached to the tray 100, so as to be favorable to heat exchange between the battery 210 and the tray 100. Specifically, an outer surface of the cooling plate 220 may be tightly attached to the heat conduction pad, and the heat conduction pad may be tightly attached to the bottom plate 120 of the tray 100.

Preferably, as shown in FIG. 7 and FIG. 8, each battery assembly 20 may include a plurality of cooling plates 220, and each battery assembly 20 may further include a batten 230. The batten 230 may extend along circumference of the battery 210, and each of the plurality of cooling plates 220 is tightly attached to the battery 210 and is fastened with the batten 230.

It may be understood that, the plurality of cooling plates 220 is tightly attached to the battery 210 to wrap at least a part of the outer surface of the battery 210. For example, each battery assembly 20 may include two cooling plates 220, each of the two cooling plates 220 may be constructed into a U-shaped plate, and each of the two cooling plates 220 wraps at least a part of the outer surface of the battery 210. The batten 230 may be constructed into a U-shaped band, two battens 230 may cooperate with each other to surround the battery 210 and fasten the cooling plates 220, and each battery assembly 20 may be correspondingly provided with two pairs of battens 230.

Preferably, as shown in FIG. 8, a heat conduction sheet 240 may be clamped between the cooling plate 220 and the battery 210, and the heat conduction sheet 240 may be made of a material having good heat conduction performance, such as copper, aluminum, or graphite.

Preferably, as shown in FIG. 7 and FIG. 8, the cooling plate 220 may include a plate body 221 and a heat pipe 222, a mounting slot may be provided on the plate body 221, and the heat pipe 222 may be disposed in the mounting slot. Optionally, the heat pipe 222 may be inserted into the mounting slot. therefore, efficiency of heat exchange between the battery 210 and the cooling plate 220 is high.

Optionally, the plate body 221 may be an aluminum product or an aluminum alloy product.

Preferably, the mounting slot may include a first mounting slot and a second mounting slot. The first mounting slot may be provided at a side of the plate body 221 toward the battery 210, and the first mounting slot may open toward the battery 210. The second mounting slot may be provided at another side of the plate body 221 away from the battery 210, and the second mounting slot may open toward a direction away from the battery 210.

It may be understood that, the heat pipe 222 disposed in the first mounting slot is used to perform heat exchange between the battery 210 and the plate body 221, and the heat pipe 222 disposed in the second mounting slot is used to perform heat exchange between the plate body 221 and the tray 100. Therefore, heat exchange efficiency of the battery pack assembly 1 is high.

Further, there may be a plurality of first mounting slots and a plurality of second mounting slots, and the plurality of second mounting slots and the plurality of first mounting slots may be staggered with each other. Therefore, temperatures of parts of the plate body 221 are more balanced, and heat exchange efficiency of the battery pack assembly 1 is high.

To sum up, the battery pack assembly 1 according to this embodiment of the present invention has a small volume and good heat exchange performance, the flow channels 130 of the battery pack assembly 1 are arranged concisely, wiring of the flow channels 130 is clearer, the water cooling mode and the air cooling mode may be compatible in the battery pack assembly 1. Particularly, in the water cooling mode, even if a cooling liquid leaks, the cooling liquid may directly flow outward, the battery assembly 20 is not short-circuited, the battery pack assembly 1 is used more safely, and the tray 100 provided with the flow channels 130 can further implement energy-absorbing crumple at the time of encountering collision. This may relatively well protect the battery assembly 20.

A vehicle according to an embodiment of the present invention is described below.

As shown in FIG. 1 to FIG. 8, the vehicle according to this embodiment of the present invention is provided with any battery pack assembly 1 described in the foregoing embodiment.

Based on the vehicle according to this embodiment of the present invention, the battery pack assembly 1 occupies a small mounting space, and the battery pack assembly 1 of the vehicle has high heat exchange efficiency and is used more safely.

In the descriptions of this specification, a description of a reference term such as "an embodiment", "some embodiments", "an example", "a specific example", or "some examples" means that a specific feature, structure, material, or characteristic that is described with reference to the embodiment or the example is included in at least one embodiment or example of the present invention. In this specification, exemplary descriptions of the foregoing terms do not necessarily refer to a same embodiment or example. In addition, the described specific feature, structure, material, or characteristic may be combined in a proper manner in any one or more embodiments or examples. In addition, with no conflict, a person skilled in the art can integrate and combine different embodiments or examples and features of the different embodiments and examples described in this specification.

Although the embodiments of the present invention are shown and described above, it can be understood that the foregoing embodiments are exemplary, and should not be construed as limitations to the present invention. A person of ordinary skill in the art can make changes, modifications, replacements, and variations to the foregoing embodiments within the scope of the present invention.

What is claimed is:

1. A tray, comprising:
   a bottom plate comprising a plurality of sub-bottom plates including at least one first sub-bottom plate and at least one second sub-bottom plate, wherein the at least one first sub-bottom plate and the at least one second sub-bottom plate are individual plates and are in parallel to each other in a same plane,
   wherein the at least one first sub-bottom plate comprises a flow channel, a heat exchange medium flows in the flow channel, the at least one first sub-bottom plate is configured to cool a battery assembly, and the battery assembly is mounted on the at least one first sub-bottom plate, and
   wherein the at least one second sub-bottom plate includes no flow channel, and the battery assembly is not mounted on the at least one second sub-bottom plate; and
   a frame surrounding edges of the at least one first sub-bottom plate and the at least one second sub-bottom plate, wherein the at least one first sub-bottom plate and the at least one second sub-bottom plate are connected to the frame.

2. The tray according to claim 1, wherein the at least one second sub-bottom plate is spliced or staggered with the at least one first sub-bottom plate.

3. The tray according to claim 2, wherein the at least one first sub-bottom plate is connected in parallel to the flow channel in a one-to-one correspondence to at least another one first sub-bottom plate.

4. The tray according to claim 2, wherein the at least one first sub-bottom plate comprises:
   a first part, wherein a plurality of channels is provided in the first part; and
   two second parts, wherein the two second parts are respectively disposed at two ends of the first part, at least one groove opening toward the first part is provided in each second part, and the plurality of channels is in communication with the groove to form the flow channel.

5. The tray according to claim 4, further comprising a pipe connector disposed on each second part, where the flow channel is configured to communicate with a heat exchange device with the pipe connector.

6. The tray according to claim 1, wherein the at least one first sub-bottom plate comprises:

a main body part comprising a flow path, wherein a middle portion of the flow path is provided with a plurality of opening portions; and a plurality of seal portions connected to the main body part, sealing the plurality of opening portions in a one-to-one correspondence to form the flow channel.

7. The tray according to claim 6, further comprising at least two connectors disposed on the main body part, wherein a heat exchange device is in communication with the flow channel with the connectors.

8. The tray according to claim 1, wherein the at least one first sub-bottom plate and the flow channel are integrally formed through injection molding.

9. The tray according to claim 1, wherein the flow channel is formed through extrusion or by inserting a metal pipe into a slot of the bottom plate.

10. The tray according to claim 1, wherein the at least one first sub-bottom plate comprises an upper plate and a lower plate, and the upper plate and the lower plate are connected to define the flow channel between the upper plate and the lower plate.

11. The tray according to claim 1, wherein a surface of the bottom plate away from the battery assembly is covered with heat preservation cotton.

12. A tray assembly, comprising:
the tray according to claim 1; and
a heat exchange device configured to drive the heat exchange medium to flow in the flow channel.

13. A battery pack assembly, comprising:
at least one battery assembly; and
a tray comprising:
- a bottom plate comprising a plurality of sub-bottom plates including at least one first sub-bottom plate and at least one second sub-bottom plate, wherein the at least one first sub-bottom plate and the at least one second sub-bottom plate are individual plates and are in parallel to each other in a same plane,
- wherein the at least one first sub-bottom plate comprises a flow channel, a heat exchange medium flows in the flow channel, the at least one first sub-bottom plate is configured to cool the at least one battery assembly, and the at least one battery assembly is mounted on the at least one first sub-bottom plate, and
- wherein the at least one second sub-bottom plate includes no flow channel, and the at least one battery assembly is not mounted on the at least one second sub-bottom plate, and;
- a frame surrounding edges of the at least one first sub-bottom plate and the at least one second sub-bottom plate, wherein the at least one first sub-bottom plate and the at least one second sub-bottom plate are connected to the frame.

14. The battery pack assembly according to claim 13, wherein each of the at least one battery assembly comprises:
a battery; and
a cooling plate, wherein the battery is connected to the tray with the cooling plate.

15. The battery pack assembly according to claim 14, wherein the cooling plate comprises:
a plate body comprising a mounting slot; and
a heat pipe disposed in the mounting slot.

16. The battery pack assembly according to claim 15, wherein the mounting slot comprises:
a first mounting slot located at a first side of the plate body toward the battery; and
a second mounting slot located at a second side of the plate body away from the battery.

17. The battery pack assembly according to claim 16, wherein the second mounting slot and the first mounting slot are staggered with each other.

18. The battery pack assembly according to claim 14, further comprising:
a plurality of cooling plates, and
a batten extending along circumference of the battery, wherein each of the plurality of cooling plates is attached to the battery and is fastened with the batten.

19. The battery pack assembly according to claim 13, further comprising:
a heat conduction pad disposed between the tray and the at least one battery assembly; and
an enclosure connected to the tray to form a cavity for holding the at least one battery assembly.

20. A vehicle, provided with the battery pack assembly according to claim 13.

* * * * *